(12) United States Patent
Stahl (10) Patent No.: US 7,350,939 B2
(45) Date of Patent: Apr. 1, 2008

(54) ALIGNMENT STRUCTURE FOR USE WITH A LIGHT SOURCE AND/OR A LIGHT GATHERING REFLECTOR

(75) Inventor: Kurt A. Stahl, Portland, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 11/134,156

(22) Filed: May 20, 2005

(65) Prior Publication Data

US 2006/0262540 A1 Nov. 23, 2006

(51) Int. Cl.
*F21V 14/02* (2006.01)

(52) U.S. Cl. .................... 362/285; 362/319; 362/277; 362/362; 313/113

(58) Field of Classification Search ............... 362/514, 362/277, 319, 255, 285, 289, 418, 434, 362, 362/508; 353/87, 119; 313/318.08, 318.11, 313/113
See application file for complete search history.

(56) References Cited

U.S. PATENT DOCUMENTS

| | | | | |
|---|---|---|---|---|
| 3,671,333 A | * | 6/1972 | Mosier | 362/341 |
| 4,548,485 A | * | 10/1985 | Dean | 353/67 |
| 4,722,593 A | * | 2/1988 | Shimazaki | 349/5 |
| 5,977,694 A | * | 11/1999 | McGuire | 313/110 |
| 6,273,590 B1 | * | 8/2001 | Splane, Jr. | 362/304 |
| 6,657,369 B1 | * | 12/2003 | Tamaru et al. | 313/318.11 |

* cited by examiner

*Primary Examiner*—Sharon E. Payne
(74) *Attorney, Agent, or Firm*—Alleman Hall McCoy Tuttle LLP (57) ABSTRACT

Embodiments of methods, apparatuses, devices and systems associated with a pre-aligned light source for use with a light gathering reflector are disclosed.

20 Claims, 5 Drawing Sheets

ALIGNMENT STRUCTURE FOR USE WITH A LIGHT SOURCE AND/OR A LIGHT GATHERING REFLECTOR

BACKGROUND

Projection systems may utilize an arc lamp coupled to a light gathering reflector. Typically, the arc lamp and light gathering reflector assembly may be aligned with one or more optical components of a projection system, which may be referred to as optics. An individual arc lamp, such as those described, may have an arc gap, and the arc gap may be located at a slightly different position as compared to one or more other arc lamps. As a result, in order to achieve performance goals, an individual arc lamp may be aligned with a particular light gathering reflector. This alignment process may be empirically performed for individual arc lamp and light gathering reflector assemblies. For example, the position of the arc lamp may be adjusted until a desired output luminosity is achieved, such as by positioning the arc lamp's arc gap close to a focus of the light gathering reflector. The arc lamp may then be attached at that position to the light gathering reflector, such as by cementing the arc lamp to the light gathering reflector using a ceramic paste or other heat resistant material, for example.

This arrangement has several disadvantages. For example, arc lamps eventually burn out. An arc lamp may typically burn out primarily in two ways. The first common way is somewhat explosive and may often cause damage to the light gathering reflector. Alternatively the arc lamp can burn out in a non-destructive manner causing no damage to the light gathering reflector. However, under current designs, the light gathering reflector must be replaced regardless of the manner in which the arc lamp burns out, because the arc lamp is cemented to the light gathering reflector. Another disadvantage is that the optics for a system employing an arc lamp and light gathering reflector assembly commonly may be designed to accommodate the particular arc lamp and light gathering reflector assembly, and may not be capable of employing alternative assemblies, such as assemblies having differing optical properties, for example.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, and components have not been described in detail so as not to obscure the claimed subject matter.

Projection systems may commonly utilize an arc lamp as a portion of a light source, which may also be referred to as a burner. An arc lamp may typically comprise a bulb containing at least a portion of plasma, which is generated in and/or around an arc gap, in response to an electrical current arcing across the arc gap, and the plasma may produce light, or glow for example. The arc gap, in this context, comprises a gap between electrical current carrying elements within the bulb that are spaced such that a provided electrical current can arc across the gap, forming a glowing plasma within and around the arc gap. As alluded to previously, in order to achieve performance goals, such as particular luminosity and/or light intensity, for example, the arc lamp and/or the arc gap may be aligned with a particular light gathering reflector. Depending on numerous factors which may include particular manufacturing processes utilized to form arc lamps, a particular arc lamp may have an arc gap having a different position than an arc lamp formed by use of the same, a substantially similar, and/or a differing manufacturing process, for example. As a result, a particular arc lamp may be individually aligned with a corresponding light gathering reflector. A misaligned arc lamp can result in diminished output luminosity and possible distortion patterns in any output light, for example. Alignment of an arc lamp with a light gathering reflector may comprise an empirical alignment with the light gathering reflector, meaning, for example, that the position of the arc lamp is adjusted until a desired output luminosity is achieved. Tolerances for this alignment process are typically on the order of approximately +/−50 microns, for example. The position of the arc lamp usually results in the arc lamp's arc gap being positioned close to a focus, or focal point, of the reflector.

After the alignment process, the arc lamp may then be attached at that position to the light gathering reflector, such as by cementing the arc lamp to the light gathering reflector using a ceramic paste or other heat resistant material, for example. In this arrangement, one or more wires may be coupled to the arc lamp in order to complete an electrical circuit for the arc lamp, for example. Commonly, one wire may be threaded through the body of the light gathering reflector, and a second wire may be coupled to the end of the arc lamp. In addition, instead of being threaded through the body of the light gathering reflector, the second wire may be bent back to travel along the outside of the bulb so that both wires exit at the end of the arc lamp, for example. Alternatively, one or more additional electrodes may be used as well, such as a coil wrapped around the arc lamp, which may be configured to create a magnetic field that lowers the current required to start the arc lamp, as just an example, although this is not a requirement.

As stated previously, attaching an arc lamp to a light gathering reflector in the above-described manner may have several disadvantages. For example, arc lamps eventually burn out, and, in the configuration recited previously, when an arc lamp burns out or otherwise becomes non-functional, the light gathering reflector and arc lamp assembly must be replaced, because of the manner in which the arc lamp is attached to the light gathering reflector. Another disadvantage is that the optics for a system utilizing an arc lamp and light gathering reflector assembly may be designed to accommodate the particular arc lamp and light gathering reflector assembly, and may therefore not be capable of utilizing alternative assemblies, such as assemblies having differing optical properties, for example. Yet another disadvantage of this particular configuration is that the arc lamp cannot be upgraded or changed without also replacing the light gathering reflector.

Arc lamp and light gathering reflector assemblies are commonly used in numerous types of projection systems including both imaging and non-imaging uses. The light gathering reflector/arc lamp assembly is commonly used in conjunction with the optical and analog or digital components of a digital or analog projection system to project images. Under this arrangement the overall optics of the system are designed to work with light gathering reflector/arc lamp assemblies having specific characteristics, for example. Although the foregoing examples deal with projection systems, it should be noted that the claimed subject matter is not so limited. For example, arc lamp and light gathering reflector assemblies in accordance with one or more embodiments may be utilized in one or more imaging and/or non-imaging applications including, but not limited to the following: rear projection systems; front projection systems, liquid crystal display (LCD) systems; digital light projection (DLP) systems; stage lights; spot lights; headlights; reflective LCD; liquid crystal on silicon; and/or a wide variety of imaging and/or non-imaging systems, but, again, the claimed subject matter is not limited to any particular application.

Figure 1:
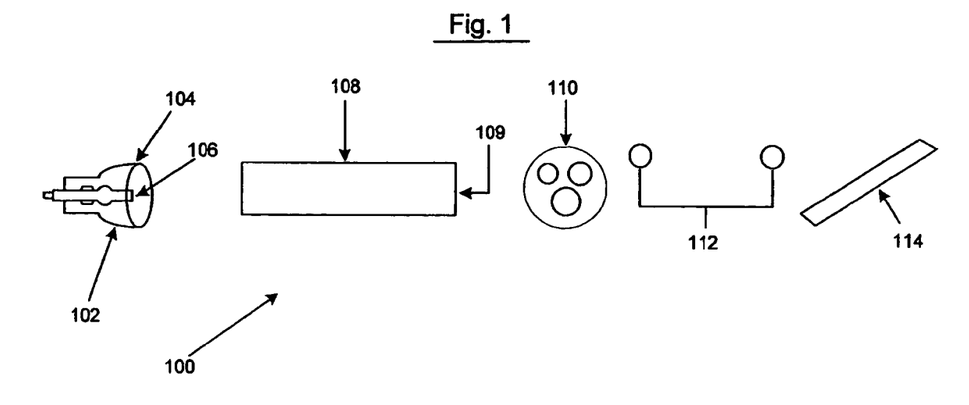
FIG. 1 is a schematic diagram of a projection system including a light-generating component, in accordance with at least one embodiment.

FIG. 1 illustrates a schematic diagram of a projection system 100. Projection system 100 includes a light-generating component 102, which includes a light gathering reflector 104 and an arc lamp 106. Although illustrated as having an at least partially convex surface, light gathering reflector 104 may comprise a reflector having one or more additional shapes, such as substantially conic, which may include substantially parabolic reflectors and substantially elliptical reflectors, as a few examples. Such substantially parabolic reflectors typically may be used with LCD type projectors, while substantially elliptical reflectors may typically be used with DLP micro-mirror projectors. Thus it should be understood that the light-gathering reflector may be parabolic and/or ellipsoidal, as just a few examples.

Arc lamp 106 may comprise one or more types of light sources, such as a high-pressure mercury arc lamp, a halogen lamp, a halogen-tungsten lamp, for example, but, again, the claimed subject matter is not so limited. Additionally, it will be clear to those skilled in the art, in light of this specification, that many alternatives for light gathering reflector 104 and arc lamp 106 are available and that the claimed subject matter should not be limited to the examples described herein.

Projection system 100 may further include an integration tunnel 108, though in alternate configurations more than one integration tunnel may be used. Integration tunnel 108 may function to distribute light from light-generating component 102 across an aperture 109 of integration tunnel 108. Typically, the evenness of the distributed light may depend at least in part on the length of integration tunnel 108. For example, a longer integration tunnel 108 may result in more evenly distributed light at aperture 109. Projection system 100 may further include a color wheel 110 that at least in part filters the distributed light into red blue and green "RBG" light, or other color combinations, which may be used to produce color images, although, in alternative embodiments, no color wheel may be utilized, for example, and/or the spatial integrating function of the integration tunnel 108 may be accomplished employing one or more lenslet arrays (not shown), which may sometimes be referred to as "fly's eye" lenses, for example.

Projection system 100 may further include optical components 112, which may comprise one or more lenses, prisms, mirrors, filters, retarders, etc. and may be configured to direct and/or focus the distributed filtered light, for example. Projection system 100 may include a panel or imager 114, such as an LCD panel or a micro-mirror panel which may be configured to receive at least a portion of the RGB light and produce one or more images, for example. Imager 114 may comprise one or more reflective LCD panels, transmissive LCD panels, liquid crystal on silicon panels, micro-mirror devices, such as digital light processors (DLPs) and/or a variety of other image producing devices. Projection system 100 may additionally include one or more other types of optics, such as projection optics (not shown), which may be capable of projecting the produced images, for example.

Figure 2:
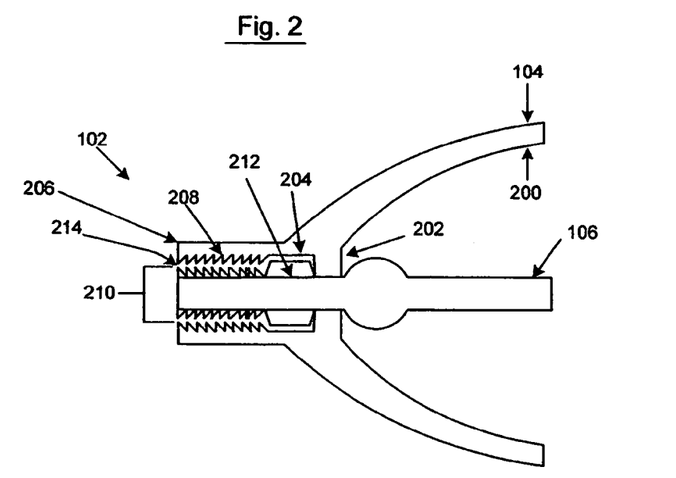
FIG. 2 is a cross sectional view of a light generating component, including an arc lamp and light gathering reflector, in accordance with at least one embodiment.

Illustrated in FIG. 2 is a cross sectional view of a light-generating component, such as light generating component 102 of FIG. 1. Although shown in the context of digital projection system 100, light-generating component 102 is not limited to use in such a system. As mentioned above, light-generating component 102 may be used in a variety of systems, including but not limited to the following: rear projection systems; front projection systems, liquid crystal display (LCD) systems; digital light projection (DLP) systems; stage lights; spot lights; headlights; reflective LCD; liquid crystal on silicon; and/or a wide variety of imaging and/or non-imaging systems, but, again, the claimed subject matter is not limited to any particular application. As discussed above, light-generating component 102 may include a light gathering reflector 104 and/or arc lamp 106, for example. Light gathering reflector 104 may be formed from a variety of materials including but not limited to: glass; metal; devitrified glass; plastic; and/or any number of other materials or combination of materials, but the claimed subject matter is not so limited, and a light gathering reflector suitable for use in one or more of the described embodiments may be formed from any material or combination of materials suitable for use as a light gathering reflector, for example.

Additionally, light gathering reflector 104 may have an interior surface 200, wherein interior surface 200 may be at least partially coated with one or more materials, such as one or more dielectric materials, for example, but in alternative embodiments, no coating may be utilized, and the use of a coating may depend on the material used for light gathering reflector 104, for example. The coating may be such that it may operate to render surface 200 highly reflective for a wavelength range of interest, and/or to alter a spectral content of any reflected light by transmitting and/or absorbing ultraviolet and/or infrared light, for example.

Figure 3:
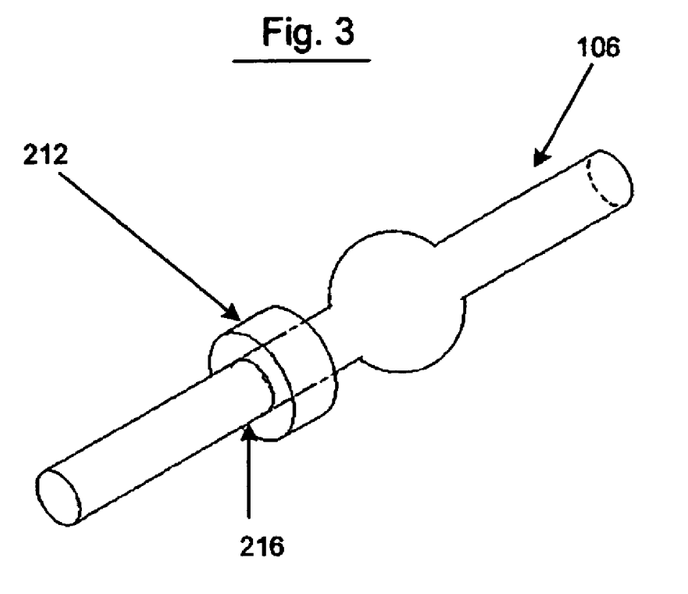
FIG. 3 is a perspective view of an arc lamp with an attached alignment collar, in accordance with at least one embodiment.

Light gathering reflector 104 may include a clearance opening 202 and/or an alignment groove 204. Light gathering reflector 104 may further include a cylinder or barrel 206, which may sometimes be referred to a neck of light gather reflector 104, for example, which may include a set of reflector threads 208 and a reflector opening 210. Reflector opening 210 may be sized so that arc lamp 106 can be positioned at least partially within reflector opening 210. An alignment structure 212 may be coupled to arc lamp 106. Alignment structure 212 may comprise a collar (as shown) sized to fit over a portion of arc lamp 106, for example. Although alignment structure 212 is shown as a single piece, it will be clear to one skilled in the art that many other configurations can be used, such as two or more pieces that fit over a portion of arc lamp 106, for example. Additionally, alternate configurations may cover a portion of arc lamp 106 while performing the function described more fully below, for example. However, it should be understood that the collar structure illustrated in FIGS. 2 and/or 3 are provided as examples and should not be construed as a limitation of the claimed subject matter.

Arc lamp 106 may be configured such that alignment structure 212 is positioned at least partially within a corresponding structure of light gathering reflector 104, such as reflector opening 210 and/or alignment groove 204. Additionally a portion of alignment structure 212 may make at least partial contact with a portion of alignment lip 202, for example. Reflector threads 208 may be formed into light gathering reflector 104, such as by molding, for example. Alternatively, reflector threads 208 can be formed separately and attached, such as by gluing or cementing, for example, to light gathering reflector 104. Approaches for forming reflector threads 208 may depend, at least in part, on the material used for light gathering reflector 104, for example. A retaining structure 214 may hold alignment collar 212 substantially against alignment lip 202, such that movement of alignment collar 212 is at least partially constrained. Retaining structure 214 may comprise a retaining ring having threads as shown in FIG. 2, in which case retaining structure 214 may at least partially engage reflector threads 208 to at least partially hold alignment structure 212 in place relative to alignment groove 204 and alignment lip 202. It should be clear to one skilled in the art, however, that alternate structures can be employed to hold alignment structure 212 in place relative to alignment lip 202, such as a snap in retaining structure that may or may not be removable, retaining pins, a barbed retaining structure, and/or retaining screws, for example. Additionally, there may be one or more additional alternative structures for retaining structure 214, and the foregoing examples are provided for illustration and/or example, and the claimed subject matter is not limited to the examples described.

Figure 8:
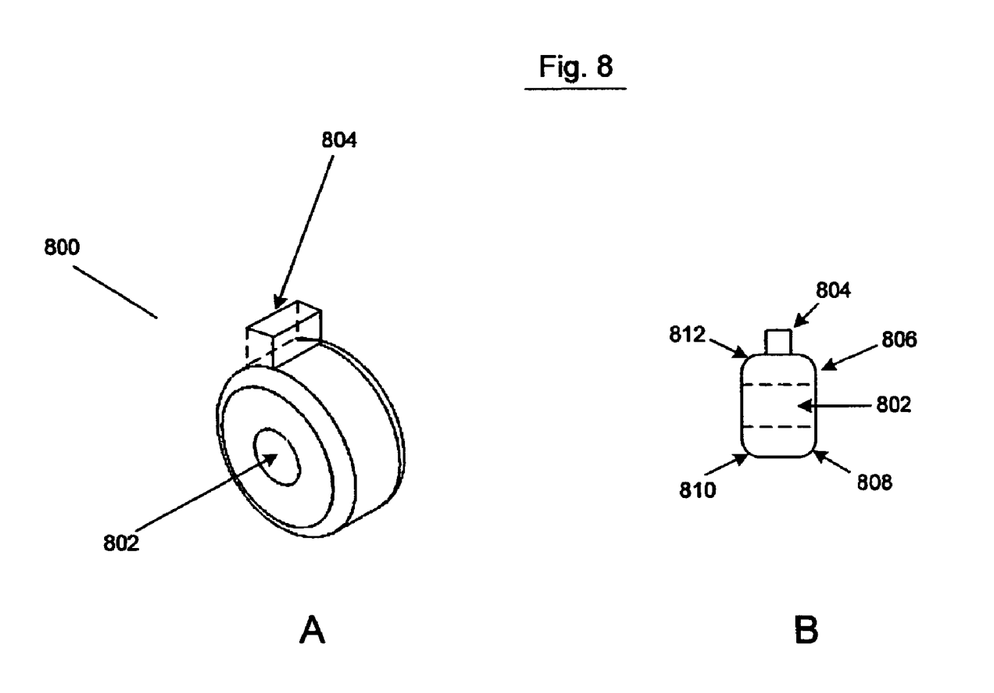
FIGS. 8A and 8B are perspective and side views, respectively, of a second alternate alignment collar having an alignment notch, in accordance with one or more embodiments.
Figure 9:
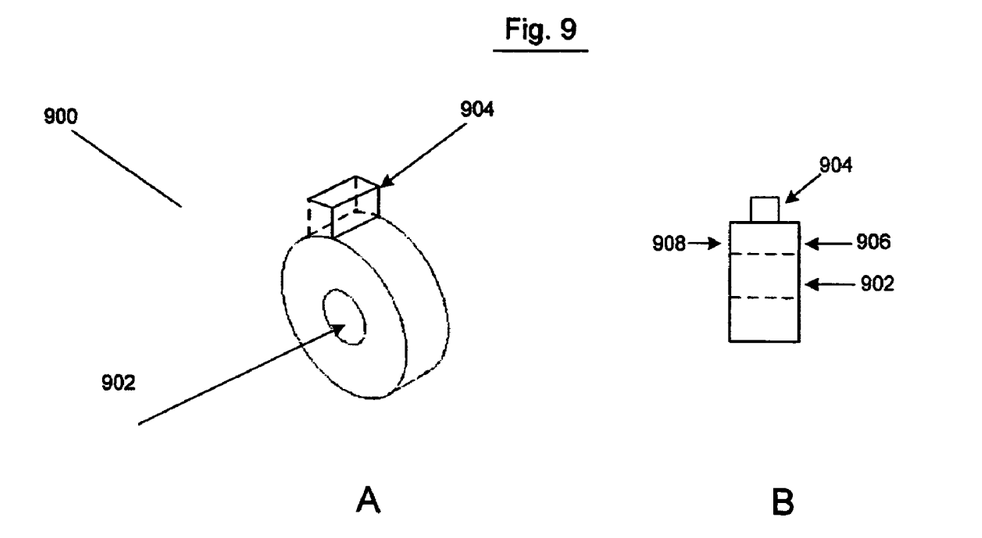
FIGS. 9A and 9B are perspective and side views, respectively, of a third alternate alignment collar having an alignment notch, in accordance with one or more embodiments.

FIG. 3 is a perspective view of arc lamp 106 with attached alignment collar 212 of FIG. 1, but, again, the claimed subject matter is not so limited. As discussed above, arc lamp 106 may comprise a high-pressure mercury lamp, which is commonly available and well known in the art. However, as additionally mentioned above, other types of lamps or lights sources can be used such as Xenon and/or other high pressure discharge lamps, halogen, tungsten-halogen, and/or a variety of other lights, for example. Alignment structure 212 may be comprised of metal, glass, ceramic, graphite composite, plastic, and/or a number of other materials or combinations of materials that may be suitable for operation with arc lamp 106, but again claimed subject matter is not limited in this respect. For example, alignment structure 212 may have heat tolerance on the order of approximately 300° C., though it should be noted that claimed subject matter is not limited in this regard. As discussed above, and more fully with regard to FIGS. 7-9 below, alignment structure 212 may be formed in a variety of shapes and/or configurations. Alignment structure 212 may be attached to arc lamp 106, such as by gluing and/or cementing alignment structure 212, and may be attached in a particular alignment position 216. However, it should be noted that numerous other attachment mechanisms exist, such as for example, ceramic paste, high temperature silicone adhesive, epoxy, and/or glass to metal brazing techniques and the claimed subject matter is not limited to the above-described examples.

Alignment position 216 may be determined by use of one or more methods, such as empirically by use of a master light gathering reflector (not shown), for example. In this embodiment, empirically determining the alignment position may comprise adjusting an illuminated arc lamp 106 inside the master light gathering reflector until a desired output luminosity is achieved at a reference aperture and/or in a projected image from a reference optical system (not shown), for example. The simulated aperture may be configured to simulate aspects of a projection system such as projection system 100, thereby resulting in a system that will produce a desired output, for example, but may additionally be configured to simulate one or more aspects of a system that may utilize components such as light generating component 102, including one or more of the systems described previously.

Typically, in order to achieve the desired output luminosity, the arc lamp may be adjusted along one or more positioning related variables such as x, y, and/or z coordinates, pitch, yaw and/or rotation, for example. The arc lamp may be adjusted within the light gathering reflector until an arc gap (not shown) of arc lamp 106 may be positioned proximal to a focus (not shown) of the master light gathering reflector, for example. An acceptable luminosity may be selected as the desired output luminosity and the position of arc lamp 106 may be adjusted along one or more of the above-mentioned positioning related variables until the desired output luminosity is substantially achieved at the reference aperture. Luminosity at a reference aperture, may in this context, be measured using an integrating sphere, such as a hollow sphere with a first hole in the side for light to go in, and/or an optical detector mounted on a second hole in the side of the sphere to measure the approximate total amount of light in the sphere. In this context, a projected image for a reference optical system may be measured with an array of optical detectors placed at certain locations within a projected image plane, for example. Additionally, luminosity at a reference aperture may be measured using a calibrated CCD camera and/or other type of camera based measurement system, wherein the camera looks at the reference aperture, and measures the luminosity, for example. It should be noted that above example are provided merely for illustration and that claimed subject matter is not limited in this regard.

Alignment structure 212 may be positioned at a particular alignment position 216 that may result in the alignment of arc lamp 106 with one or more of the aforementioned positioning related variables, resulting in the production of the desired output luminosity, substantially the desired output luminosity, and/or approximately the desired output luminosity when implemented into a system such as projection system 100, for example. Once the desired output luminosity is achieved and alignment position 216 is determined, alignment structure 212 may be attached to arc lamp 106 at alignment position 216. This process will, in effect, pre-align arc lamp 106 for use with light gathering reflector 104, for example. Pre-align, when used in this context, refers generally to a mechanism whereby a light source, such as an arc lamp, and/or an assembly, such as an arc lamp and light gathering reflector assembly, may be implemented in an optical device such as projection system 100, for example, and little if no additional aligning functions may be required in order to achieve desired optical performance from the light source and/or assembly, for example.

After attachment of alignment structure 212, arc lamp 106 may then be placed into, and at least partially secured relative to, light gathering reflector 104 as described above with respect to FIG. 2. Arc lamp 106 and light gathering reflector 102 should approximately produce the desired output luminosity at a system aperture (not shown) in projection system 100, and/or one or more of the numerous possible systems light generating component 102 may be used with, including, but not limited to, those mentioned above and/or other possible systems.

Although the claimed subject matter is not limited in this respect, a configuration incorporating one or more of the features as illustrated in FIGS. 1, 2 and/or 3 may provide one or more particular advantages. For example, as stated previously, arc lamps may be attached, such as permanently attached, to light gathering reflectors in well-known configurations, and by providing one or more capabilities including removability with respect to the arc lamp, and one or more self-alignment functions, as will be described in more detail later, arc lamps, light gathering reflectors, and/or arc lamp and light gathering reflector assemblies formed in accordance with one or more embodiments may have particular modularity. Meaning, in this context, that one or more of these components may be removed, replaced and/or substituted when implemented in a system, such as system 100 of FIG. 1 or whichever of the numerous possible systems light generating component 102 is to be used with, including, but not limited to, those mentioned above and/or other possible systems, and this may provide particular advantages including flexibility and/or configurability, for example. Although, of course, the claimed subject matter is not limited to these advantages and/or configurations.

Figure 4:
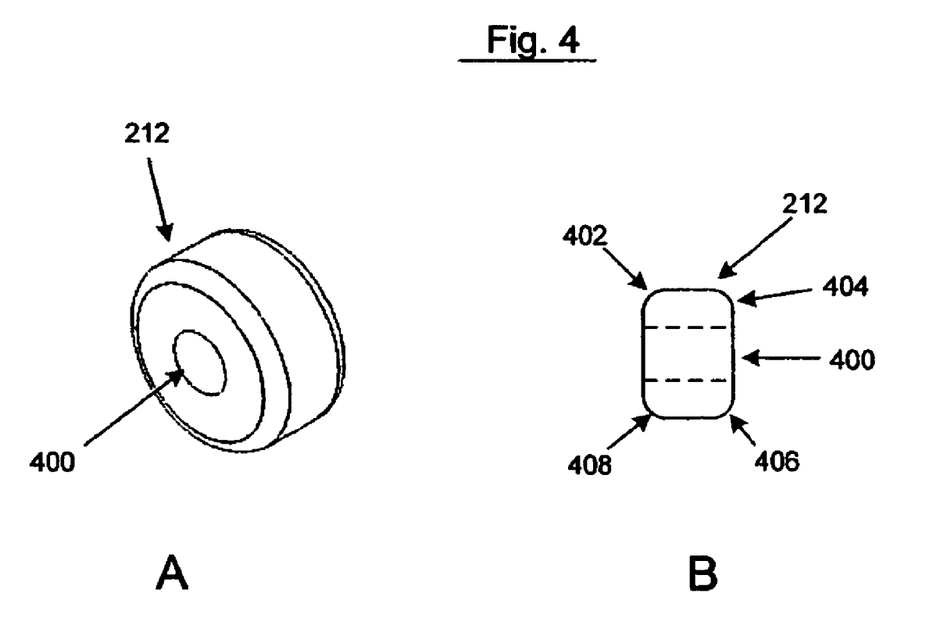
FIGS. 4A and 4B are perspective and side views, respectively, of an alignment collar, in accordance with at least one embodiment.

FIGS. 4A and 4B are perspective and side views, respectively, of an exemplary alignment structure 212. As mentioned above, alignment structure 212 may substantially comprise a collar configuration, as shown in FIG. 4A, and may comprise a disk having a collar opening 400 sized so that a portion of arc lamp 106, as shown in FIGS. 2 and/or 3 may be inserted at least partially within collar opening 400, for example. Alignment structure 212 may include curved and/or angled sides 402, 404, 406, and 408 at least two of which can engage with corresponding portions of alignment lip 202 of light gathering reflector 104, such as by at least partially contacting the corresponding portions of alignment lip 202, for example. In this context, curved and/or angled sides 402, 404, 406, and/or 408 may help to achieve accurate centering of alignment structure 212, and hence the burner 106, within the cylinder 206. Angled and/or curved sides 402, 404, 406, and/or 408 may mate with corresponding angled and/or curved features of alignment lip 202 and/or other corresponding angled and/or curved features within cylinder 206. Alignment structure 212 may be sized so that it can fit at least partially within reflector opening 210, as shown and described with reference to FIG. 2. Alignment structure 212 may additionally be configured so that it may fit at least partially within alignment groove 204, and/or at least partially secured relative to alignment lip 202, as shown and described with reference to FIG. 1.

Figure 5:
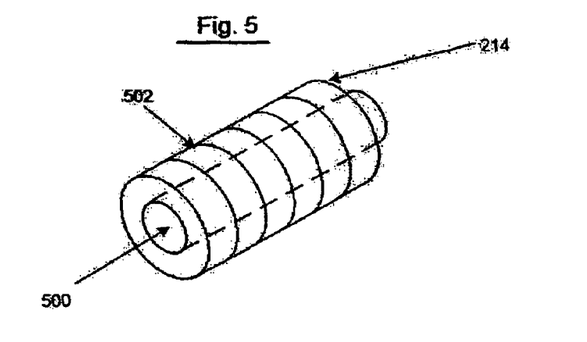
FIG. 5 is a perspective view of a retaining ring, in accordance with at least one embodiment.

FIG. 5 is a perspective view of retaining structure 214. Retaining structure 214 may include an opening 500 sized so that retaining structure 214 can fit at least partially over an end of arc lamp 106, as shown and discussed above with regard to FIG. 2. Retaining structure 214 may have one or more configurations. For example, as shown in FIG. 5, retaining structure 214 may comprise a substantially cylindrical configuration, and may be formed from a variety of materials, including metal, plastic, glass, ceramics, graphite composite, and/or any number of other suitable materials and/or combination of materials, however, the claimed subject matter is not so limited. Retaining structure 214 may further include retaining threads 502. Retaining threads 502 may be sized and positioned such that they can at least partially engage reflector threads 208 and, when screwed into place, may at least partially hold alignment structure 212 in place relative to alignment groove 204 and/or alignment lip 202. However, as stated previously, it should be clear to one skilled in the art that alternate structures can be employed to at least partially secure alignment structure 212 in place relative to alignment lip 202, such as a snap in retaining structure that may or may not be removable, retaining pins, a barbed retaining structure and/or one or more retaining screws along with a variety of other structures. Additionally, it will be clear to one skilled in the art that the above examples are provided for illustration only and the claimed subject matter should not be limited to the examples described.

Figure 6:
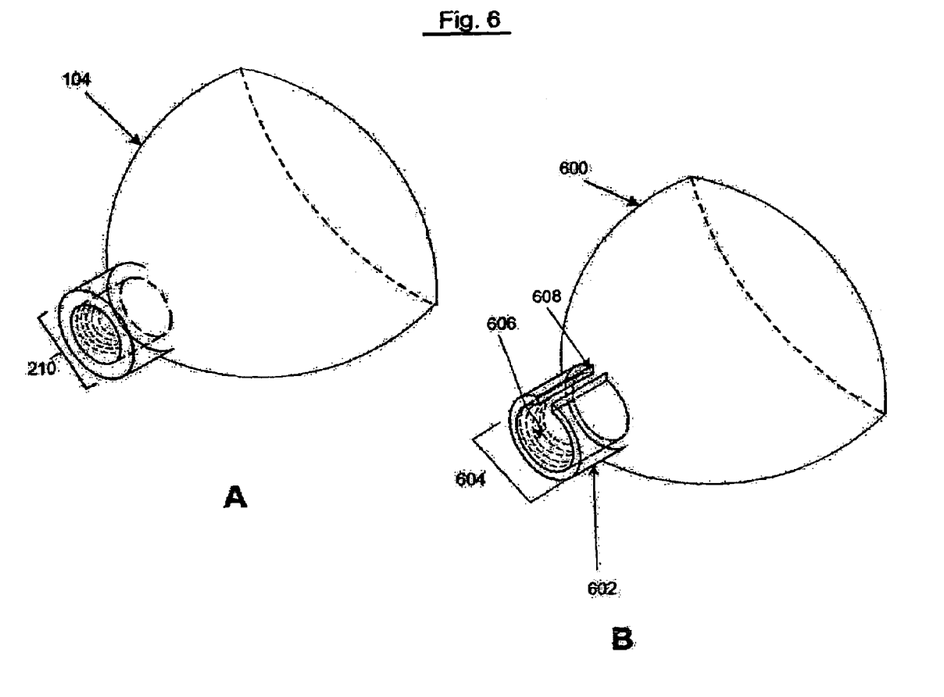
FIGS. 6A and 6B are perspective views of a light gathering reflector and an alternate light gathering reflector, respectively, in accordance with one or more embodiments.

FIGS. 6A and 6B are perspective views of exemplary light gathering reflector 104 and an exemplary alternate light gathering reflector 600, respectively. Light gathering reflector 104 and alternate light gathering reflector 600 may be any convex reflective surface such as, but not limited to, an ellipsoidal reflector, a parabolic reflector, and/or other shaped reflectors, as stated previously. Alternate light gathering reflector 600 includes a cylindrical portion 602, which may comprise a barrel and/or cylinder, for example, and may have a cylinder opening 604 sized for receiving arc lamp 106, similar to respective portions of light gathering reflector 104, for example. Cylindrical portion 602 may further comprise reflector threads 606 and a reflector alignment notch 608. Reflector alignment notch 608 is configured to substantially correspond to one or more alignment notches on alternate alignment collars, explained in more detail in reference to FIGS. 7 and/or 8, below. In conjunction, one or more embodiments of collar alignment notches and/or reflector alignment notches may be configured to at least partially secure the positioning related variable of rotation for arc lamp 106. One or more types of alternate collar alignment notch configurations and/or reflector alignment notch configurations are not illustrated in detail, and the claimed subject matter is not limited to any particular configuration of one or more alignment notches, for example. Additionally, it should be clear to those skilled in the art that many alternate structures can be employed to secure the rotational positioning related variable of arc lamp 106, and that those described above are provided as illustrations and that the claimed subject matter should not be limited to the examples described. In this context, an alignment notch may operate help center the arc gap on a long axis of arc lamp. Due to a variety of factors, arc lamp 106, such as those examples listed above, may, in this context, produce light that may not be radially symmetric about the long axis of arc lamp 106, though again it should be noted that claimed subject matter is not limited in this regard.

Figure 7:
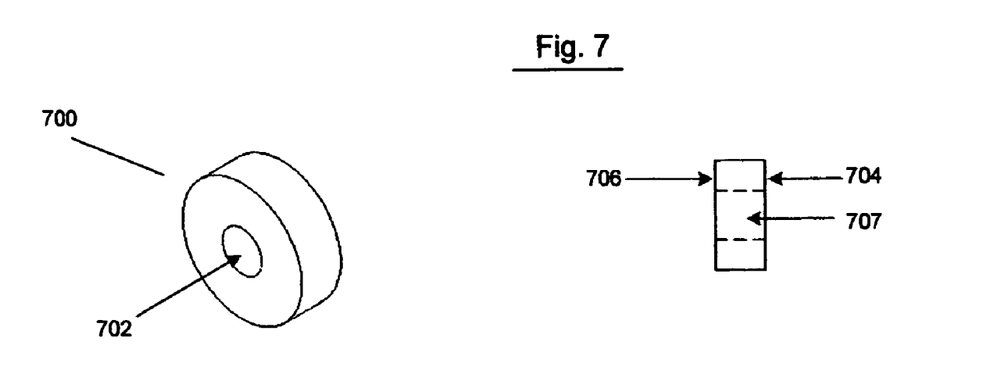
FIG. 7 includes perspective and side views of a first alternate alignment collar in accordance with one or more embodiments.

FIG. 7 includes perspective and side views, respectively, of a first alternate exemplary alignment structure 700, which may be utilized in place of alignment structure 212, for example. First alternate alignment structure 700 may comprise a disk shaped collar that includes a collar opening 702, which may be sized so that first alternate alignment structure 700 fits at least partially around a portion of arc lamp 106, as shown in FIG. 3 with regard to alignment structure 212. Sides 704 and 706 are substantially straight, as shown in FIG. 7.

FIGS. 8A and 8B are perspective and side views, respectively, of a second exemplary alternate alignment structure 800, which may be utilized in place of alignment structure 212, for example. Second alternate alignment structure 800 may comprise a disk shaped collar that includes a collar opening 802 sized so that second alternate alignment structure 800 fits at least partially around a portion of arc lamp 106, as shown in FIG. 3 with regard to alignment structure 212. Sides 806, 808, 810, and 812 may be curved and/or angled, as shown in FIG. 8B. Second alternate alignment structure 800 may have substantially the same features as alignment collar 212 with the addition of collar alignment notch 804, which corresponds to reflector alignment notch 608 (discussed above with regard to FIG. 6B) to secure the rotational positioning related variable of arc lamp 106.

FIGS. 9A and 9B are perspective and side views, respectively, of a third alternate alignment structure 900, which may be utilized in place of alignment structure 212, for example. Third alternate alignment structure 900 may comprise a disk shaped collar that includes a collar opening 902 sized so that third alternate alignment structure 900 fits at least partially around a portion of arc lamp 106, as shown in FIG. 3 with regard to alignment structure 212. Sides 904 and 906 are substantially straight, or parallel with respect to one another, as shown in FIG. 9B. Third alternate alignment structure 900 may have substantially the same features as first alternate alignment structure 700 with the addition of collar alignment notch 904, which corresponds to reflector alignment notch 608 (discussed above with regard to FIG. 6B) to secure the rotational positioning related variable of arc lamp 106.

Alignment structure 212 has been described in terms of several embodiments, with reference to FIGS. 4A, 4B, and 7-9. In one or more of the foregoing embodiments, the alignment collars may be configured to be implemented with one or more of the described alignment features, such as alignment slot 204, alignment lip 202 and/or reflector alignment notch 608 of light gathering reflector 105, and may result in the alignment of light gathering reflector 600 with an arc lamp, such as arc lamp 106, and may result in the production of a desired output luminosity, when implemented in a system aperture of a projection system, such as projection system 100 of FIG. 1 and/or one or more of the numerous possible systems light generating component 102 may be used with including but not limited to those mentioned above and/or other possible systems. However, it will be clear to those skilled in the art that many alternate shapes and designs are possible for alignment structure 212, and the alignment features of light gathering reflectors 104 and 600 while still performing their functions. The examples described above are provided for purposes of illustration not limitation and the claimed subject matter should not be limited to the above-described examples.

Figure 10:
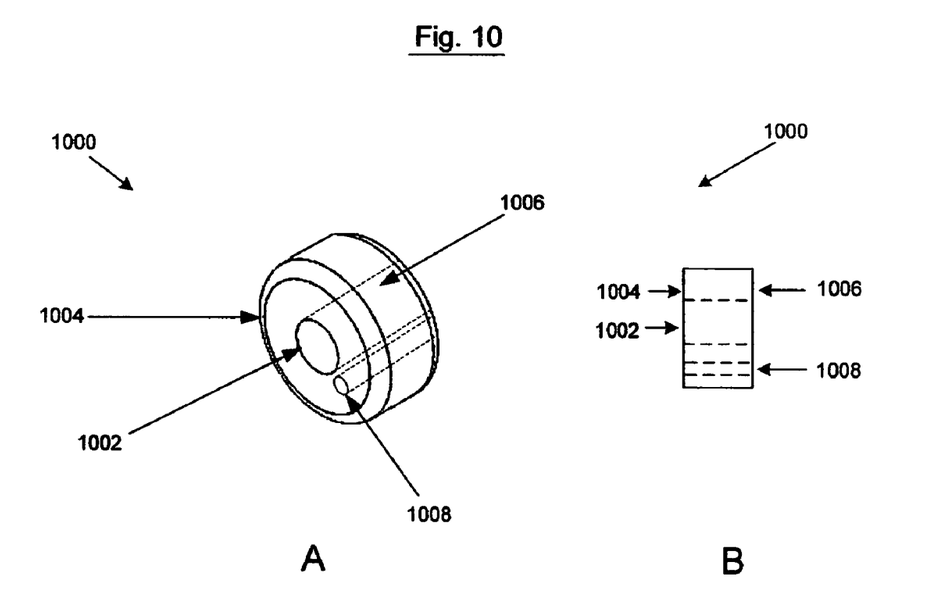
FIGS. 10A and 10B are perspective and side views, respectively, of a fourth alternate alignment collar in accordance with one or more embodiments.

FIGS. 10A and 10B are perspective and side views, respectively, of a fourth alternate alignment structure 1000, which may be utilized in place of alignment structure 212, for example. Fourth alternate alignment structure 100 may comprise a disk shaped collar that includes a collar opening 1002 sized so that fourth alternate alignment structure 1000 fits at least partially around a portion of arc lamp 106, as shown in FIG. 3 with regard to alignment structure 212. Sides 1004 and 1006 are substantially straight, or parallel with respect to one another, as shown in FIG. 9B. Alternatively sides 1004 and 1006 may include angled and/or curved portions such as those shown in, and described in regard to, FIG. 4 and FIG. 8. Fourth alternate alignment structure 1000 may have substantially the same features as first alternate alignment structure 700 with the addition of collar alignment notch 904, which corresponds to reflector alignment notch 608 (discussed above with regard to FIG. 6B) to secure the rotational positioning related variable of arc lamp 106. Additionally, fourth alternate alignment structure 1000 may include a wire opening such as opening 1008. In this context, opening 1008 may be positioned and sized so that a instead of being threaded through the body of the light gathering reflector, the second wire, discussed above with respect to FIG. 1, may be bent back to travel along the outside of light source 106 so that both the first and second wires exit at the end of the light source, for example. Though again, it should be noted that claimed subject matter is not so limited.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A projection lamp, comprising:
    a light gathering reflector having an alignment lip and a reflective internal surface with a focus;
    an arc lamp including a light generating portion and a connection portion, the connection portion to electrically couple the light generating portion to a power source; and
    a substantially ring-shaped alignment structure sized to fit around the connection portion of the arc lamp so as to be moveable along a longitudinal axis of the connection portion of the arc lamp, the substantially ring-shaped alignment structure being selectively securable directly to a selected one of a plurality of different securement locations along the longitudinal axis of the connection portion when the ring-shaped alignment structure is fit around the connection portion of the arc lamp, where the substantially ring-shaped alignment structure abuts the alignment lip of the light gathering reflector such that the location of the alignment structure on the connection portion determines a relative position of the light generating portion to the focus of the light gathering reflector.

2. The projection lamp of claim 1, where the alignment structure is sized to at least partially fit into a corresponding structure of the light gathering reflector.

3. The projection lamp of claim 2, wherein the alignment structure and the corresponding structure of the light gathering reflector cooperate to pre-align the arc lamp with the light gathering reflector to produce a desired luminosity.

4. The projection lamp of claim 1, wherein the alignment structure comprises an alignment notch.

5. The projection lamp of claim 1, wherein the alignment structure is selectively securable to the light gathering reflector.

6. The projection lamp of claim 5, wherein the alignment structure is securable by a retaining structure that engages at least a portion the light gathering reflector.

7. The projection lamp of claim 5, wherein the retaining structure comprises a ring having a first set of threads that are spaced and sized to engage a second set of threads coupled to the light gathering reflector.

8. The projection lamp of claim 1, wherein the alignment structure comprises a collar sized to fit over at least a portion of the arc lamp.

9. The projection lamp of claim 8, wherein the light gathering reflector comprises an ellipsoidal reflector.

10. An image generating projection device, comprising:
a light generating assembly, including:
a light gathering reflector having a reflective internal surface with a focus;
an arc lamp including a light generating portion and a connection portion, the connection portion to electrically couple the light generating portion to a power source; and
a substantially ring-shaped alignment structure sized to fit around the connection portion of the arc lamp so as to be moveable along a longitudinal axis of the connection portion of the arc lamp, the substantially ring-shaped alignment structure being selectively securable directly to a selected one of a plurality of different securement locations along the longitudinal axis of the connection portion when the ring-shaped alignment structure is fit around the connection portion of the arc lamp, where the substantially ring-shaped alignment structure abuts the alignment lip of the light gathering reflector such that the location of the alignment structure on the connection portion determines a relative position of the light generating portion to the focus of the light gathering reflector;
an image generating assembly configured to modulate light from the light generating assembly; and
projection optics configured to project modulated light from the image generating assembly to an image viewing surface.

11. The image generating projection device of claim 10, where the alignment structure is sized to at least partially fit into a corresponding structure of the light gathering reflector.

12. The image generating projection device of claim 11, wherein the alignment structure and the corresponding structure of the light gathering reflector cooperate to pre-align the arc lamp with the light gathering reflector to produce a desired luminosity.

13. The image generating projection device of claim 10, wherein the alignment structure comprises an alignment notch.

14. The image generating projection device of claim 10, wherein the alignment structure is selectively securable to the light gathering reflector.

15. The Image generating projection device of claim 14, wherein the alignment structure is securable by a retaining structure that engages at least a portion the light gathering reflector.

16. The image generating projection device of claim 14, wherein the retaining structure comprises a ring having a first set of threads that are spaced and sized to engage a second set of threads coupled to the light gathering reflector.

17. The image generating projection device of claim 10, wherein the alignment structure comprises a collar sized to fit over at least a portion of the arc lamp.

18. The image generating projection device of claim 17, wherein the light gathering reflector comprises an ellipsoidal reflector.

19. The image generating projection device of claim 10, wherein the viewing surface is a front projection screen.

20. The image generating projection device of claim 10, wherein the viewing surface is a rear projection screen.

* * * * *